UNITED STATES PATENT OFFICE.

OLIVER CURTIS MARTIN AND FREDERICK JAEGER, OF PERTH AMBOY, NEW JERSEY.

PROCESS FOR REGENERATING ELECTROLYTES.

1,148,522.  Specification of Letters Patent.  Patented Aug. 3, 1915.

No Drawing.  Application filed January 17, 1912. Serial No. 671,613.

*To all whom it may concern:*

Be it known that we, OLIVER C. MARTIN and FREDERICK JAEGER, citizens of the United States, residing at Perth Amboy, in the county of Middlesex and State of New Jersey, have invented new and useful Improvements in Processes for Regenerating Electrolytes, of which the following is a specification.

This invention relates to a method for the regeneration or purification of sulfuric acid electrolyte used in the refining of copper by electrolysis, and the purification of other sulfuric acid solutions as well, and has particularly for an object the removal of arsenic in a simple and inexpensive manner from such solutions.

It is also an object to enable the recovery of the arsenic in a simple and inexpensive manner.

Other objects and advantages will appear in the disclosure and application of the process.

In the purification of the electrolyte it is necessary to remove all or nearly all of the copper. In the event that it is desired to renew the copper sulfate in the solution after purification, it may nearly all be removed by crystallization after evaporation of the solution to the proper specific gravity and returned when required. In practice it is found best to evaporate the solution for this purpose to a point where it contains about 30 per cent. acid, though it is necessary then to remove the remaining copper by electrolysis, in which operation some arsenic is likewise taken from the solution along with the copper. If the sulfate is not to be returned to the solution and it is not preserved as such, the copper may be removed as far as possible by electrolysis, anodes of insoluble material being used in this operation. In the latter case it will be apparent that the removal of the copper need not take the form of a special treatment, but may be accomplished in the tank house by the substitution of the insoluble anode for the copper anode; and the subsequent removal of the mother liquor for elimination of the arsenic is also not a special movement, for it is necessary in the regular refining process, to enable the removal and treatment of the slimes or "mud" for by-products. Also, the removal of the copper by electrolysis sets free the radical "sulfion" which, being incapable of existing so, immediately combines with some of the water of the liquor to form an increased amount of sulfuric acid, and liberates oxygen. This lessens the amount of evaporation necessary in the subsequent operations, as will be noted.

After the removal of the copper there are two or more methods available for the elimination of the arsenic, in accordance with this invention. The arsenic is contained in the liquor in the form of arsenic pentoxid, and we find that by reducing this to the arsenious form and concentrating or diluting the solution so that it contains thirty-eight per cent. (38%) sulfuric acid, more or less and cooling, the arsenious acid is precipitated as an anhydrid. By one method the solution is evaporated to a very saturated state; in the early stages any nickel sulfate therein being precipitated; and when there is present in the neighborhood of seventy-four per cent. (74%) sulfuric acid, the solution is boiled with some reducing agent such as carbon in the form of charcoal, or some other cheap agent for the reduction. Boiling with charcoal reduces a portion of the sulfuric acid to the sulfurous form, which immediately or simultaneously attacks the arsenic acid, leaving it in the arsenious form and is thereby oxidized back to sulfuric acid. Carbonic acid is liberated.

The foregoing is approximately a statement of the action, though our invention may not be dependent upon the exact sequence and order of atomic interchange indicated. That is to say, the carbon may attack the arsenic and sulfuric acids simultaneously, for the satisfaction of its requirement of oxygen under the condition produced, or other action occur, though it is believed the first hypothesis is correct. The solution is next diluted—which may be done while it is still hot—to the condition of thirty-eight per cent. (38%) sulfuric acid, more or less, and allowed to cool, whereupon the arsenious acid drops out as a gray residue mixed more or less with carbon. This allows the purified sulfuric acid solution to be siphoned off with ease, and it is immediately ready to be used in making up new electrolyte. This method of removing arsenic is thought to be best suited to use with the first described method of removing the copper, although the association is not essential.

A second method of removing the arsenic after removal of the copper has been used, and is thought to be most desirable when the copper is extracted by electrolysis, although, as in the previous case such sequence is not essential, and it may just as well be used after precipitation of the bluestone, or rather crystallization thereof. A small amount of copper may remain in the electrolyte during this treatment if the nickel is not to be removed; in practice thus far, between 0.3% and 0.4% (between three and four tenths of one per cent.) having been suffered to remain during the treatment now to be described, without contaminating the arsenic. The desulfated or decoppered solution is subjected to the action of a reducing agent, and preferably sulfurous acid gas, because of the simplicity and cheapness of its production, and because it also augments the quantity of sulfuric acid; thereby giving further compensation for its production in addition to the reduction of the arsenic acid. The gas attacks the arsenic acid depriving it of some of its oxygen and combines with water of the solution, forming sulfuric acid, and leaving the arsenic in the arsenious anhydrid form so that it will be precipitated when the liquor has the acid content of 38% (thirty-eight per cent.) sulfuric acid, more or less. The solution is brought to the last named condition; and upon cooling the arsenious compound settles as a gray or grayish brown crystal, leaving the liquor clear thereabove so that it may be quickly siphoned off and returned to the electrolyte tanks. The arsenious anhydrid obtained by these methods may contain some impurities, which are readily removable by sublimation, giving a marketable by-product.

The reduction processes described may be carried on in the customary apparatus used in such processes and generally familiar to those versed in the art.

It will be apparent that a simple and easily practicable method of maintaining the efficiency of an electrolyte is presented, involving a minimum of expense both for materials and for labor, when the various requirements of use of the electrolyte are considered.

What is claimed is:

The method of removing arsenic from sulfuric acid and copper sulfate electrolyte solutions consisting in concentrating the impure electrolyte, removing the major portion of the copper sulfate, bringing the decoppered concentrated fluid and sulfurous acid gas into intimate contact by introducing the latter as such, and then diluting and cooling the fluid until precipitation of the arsenic compound therein.

In testimony whereof we have hereunto set our hands in presence of two subscribing witnesses.

OLIVER CURTIS MARTIN.
FREDERICK JAEGER.

Witnesses:
JOSEPH WARREN HUTTY,
RALPH EDWARD VINING.